United States Patent
Kuroda

(10) Patent No.: US 8,870,201 B2
(45) Date of Patent: Oct. 28, 2014

(54) STABILIZER LINK AND METHOD FOR MANUFACTURING SAME

(75) Inventor: Shigeru Kuroda, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 0 days.

(21) Appl. No.: 14/110,642

(22) PCT Filed: Apr. 3, 2012

(86) PCT No.: PCT/JP2012/059037
§ 371 (c)(1),
(2), (4) Date: Oct. 8, 2013

(87) PCT Pub. No.: WO2012/141039
PCT Pub. Date: Oct. 18, 2012

(65) Prior Publication Data
US 2014/0027995 A1    Jan. 30, 2014

(30) Foreign Application Priority Data

Apr. 14, 2011    (JP) .................................. 2011-090025

(51) Int. Cl.
*B29C 45/14* (2006.01)
*F16C 11/06* (2006.01)
*B60G 21/055* (2006.01)

(52) U.S. Cl.
CPC ....... *B29C 45/14008* (2013.01); *F16C 11/0685* (2013.01); *F16C 11/0642* (2013.01); *F16C 11/0633* (2013.01); *B60G 2202/135* (2013.01); *B60G 2204/416* (2013.01); *B60G 2204/1224* (2013.01); *B60G 21/055* (2013.01)
USPC ...................... 280/93.511; 403/133

(58) Field of Classification Search
USPC .......... 280/93.511, 93.51; 403/130–135, 122, 403/125, 76; 264/242; 29/441.1
See application file for complete search history.

(56) References Cited

U.S. PATENT DOCUMENTS 5,427,467 A    6/1995 Sugiura
5,613,792 A *  3/1997 Terada et al. .................. 403/131
(Continued)

FOREIGN PATENT DOCUMENTS

EP    1 217 233 A1    6/2002
JP    A-5-65916       3/1993
(Continued)

OTHER PUBLICATIONS

International Search Report issued in International Patent Application No. PCT/JP2012/059037 mailed Jun. 12, 2012.
(Continued)

*Primary Examiner* — Drew Brown
(74) *Attorney, Agent, or Firm* — Oliff PLC

(57) ABSTRACT

A stabilizer link in which weight reduction can be achieved and the circumferential position and the distance between both housings can be adjusted, and a method for manufacturing same, are provided. A solid bar made of a light weight metal or a fiber reinforced plastic is used for a support bar. An end portion of the support bar is inserted into a mold as a core, and a housing is formed at the end portion of the support bar by injection molding. In this case, the resin is mold-shrunk, whereby a boss portion of the housing covers and adheres to the whole circumference of the end portion of the support bar thereof. Therefore, the boss portion is rigidly fixed to the end portion.

10 Claims, 7 Drawing Sheets

(56) References Cited

U.S. PATENT DOCUMENTS

| | | | |
|---|---|---|---|
| 5,615,967 A * | 4/1997 | Hellon | 403/133 |
| 5,626,433 A * | 5/1997 | Iwamoto | 403/76 |
| 6,139,788 A | 10/2000 | Dorr | |
| 6,164,860 A * | 12/2000 | Kondo | 403/132 |
| 7,134,801 B2 * | 11/2006 | Kuroda | 403/135 |
| 8,376,647 B2 * | 2/2013 | Kuroda | 403/134 |
| 8,550,741 B2 * | 10/2013 | Kuroda | 403/143 |
| 8,684,621 B2 * | 4/2014 | Forthaus et al. | 403/135 |
| 2002/0096799 A1 | 7/2002 | Kim et al. | |
| 2004/0258461 A1 * | 12/2004 | Wolf et al. | 403/133 |
| 2008/0211202 A1 | 9/2008 | Belding et al. | |
| 2009/0001681 A1 * | 1/2009 | Morales Arnaez | 280/124.134 |
| 2011/0033226 A1 | 2/2011 | Kuroda | |
| 2011/0072667 A1 | 3/2011 | Michioka et al. | |
| 2013/0147148 A1 | 6/2013 | Kuroda | |

FOREIGN PATENT DOCUMENTS

| | | |
|---|---|---|
| JP | A-6-117429 | 4/1994 |
| JP | A-7-54835 | 2/1995 |
| JP | A-8-284947 | 11/1996 |
| JP | A-2002-235729 | 8/2002 |
| JP | A-2004-316771 | 11/2004 |
| JP | A-2005-265134 | 9/2005 |
| JP | A-2008-164126 | 7/2008 |
| JP | A-2009-257507 | 11/2009 |
| JP | A-2011-69394 | 4/2011 |
| JP | A-2011-247338 | 12/2011 |
| JP | A-2012-41013 | 3/2012 |
| WO | WO 2006/127707 A2 | 11/2006 |
| WO | WO 2011/148792 A1 | 12/2011 |

OTHER PUBLICATIONS

Aug. 21, 2014 Extended European Search Report issued in EP 12 77 1443.4.

* cited by examiner

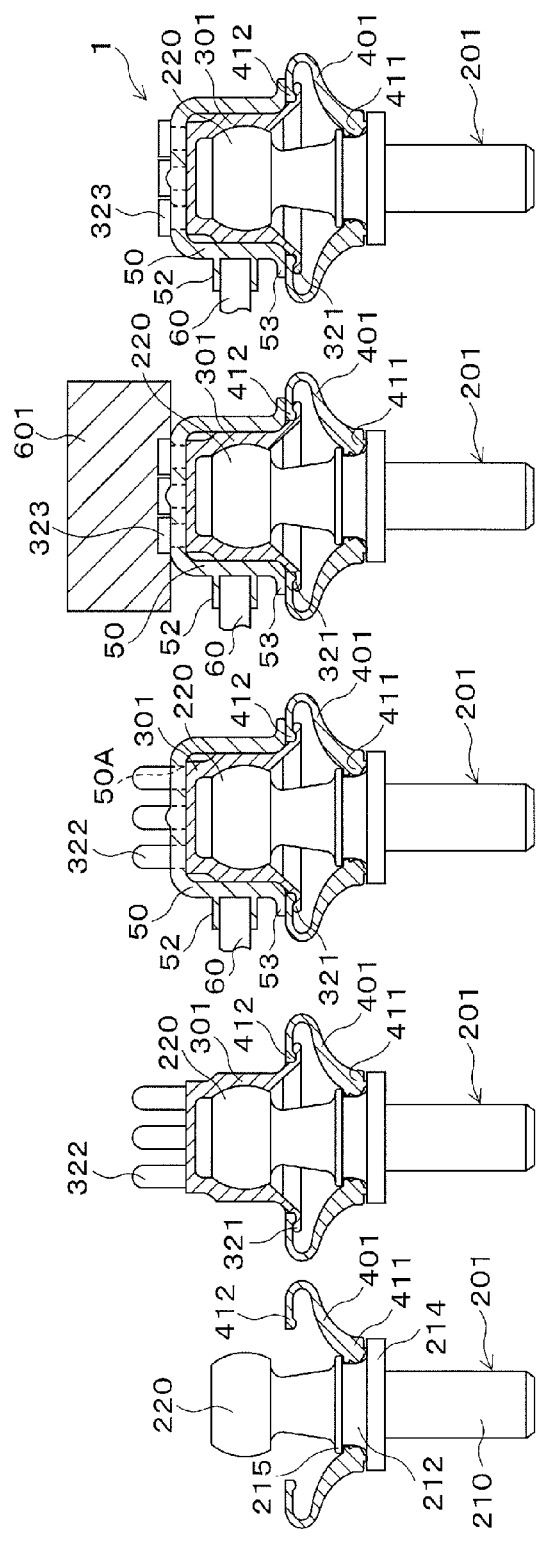

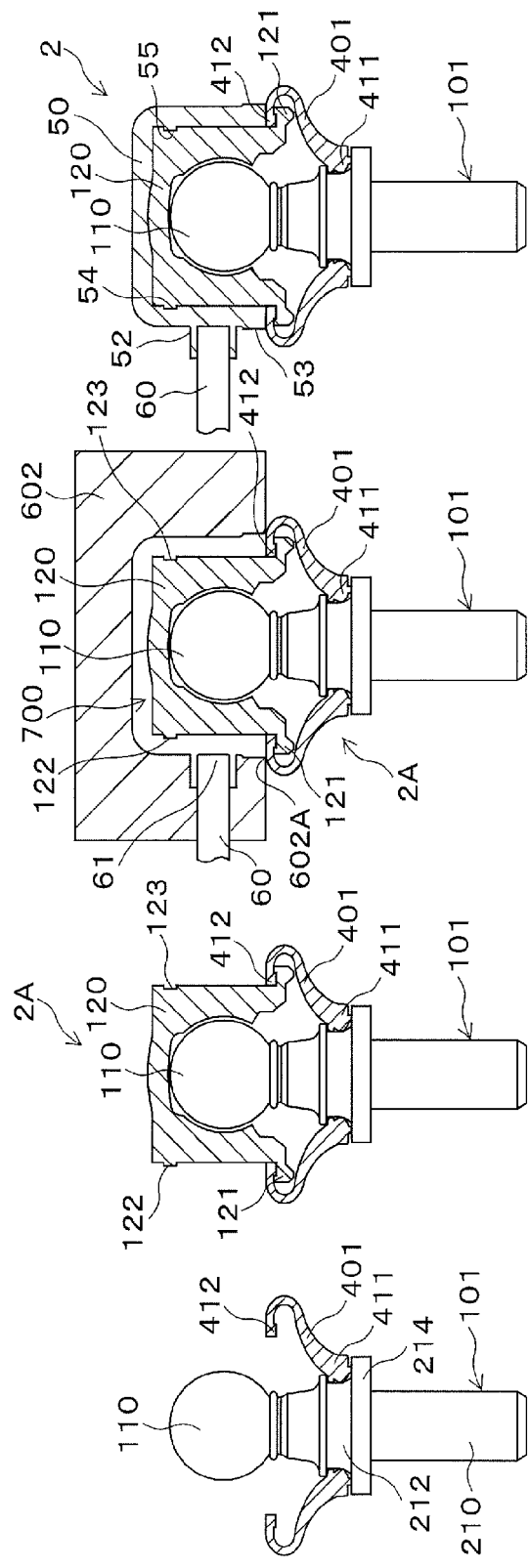

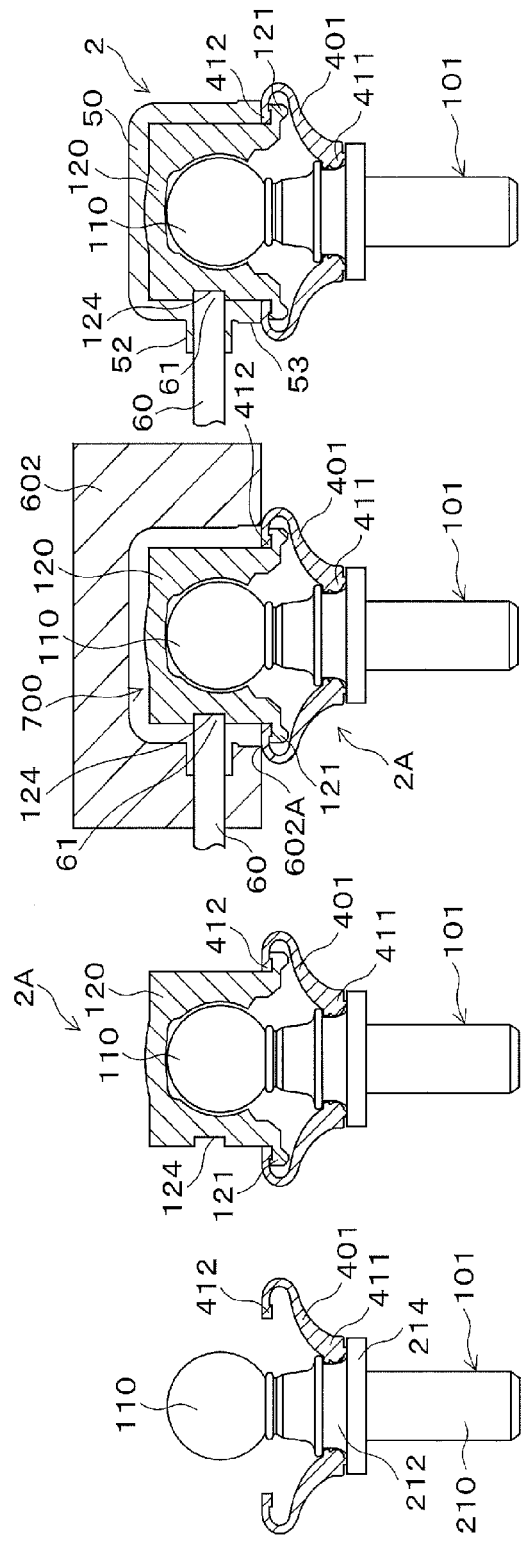

STABILIZER LINK AND METHOD FOR MANUFACTURING SAME

TECHNICAL FIELD

The present invention relates to a stabilizer link for vehicles such as automobiles, and specifically, relates an improved housing and supporting bar for a stabilizer link.

BACKGROUND ART

A stabilizer link is a part for connecting a suspension device and a stabilizer device. FIG. 1 is a perspective view showing a schematic structure of a front wheel side. A suspension device 10 is provided to right and left tires 30 and comprises an arm 11 and a cylinder 12. The lower end of the arm 11 is attached to a bearing portion which supports a shaft of the tire 30. The cylinder 12 elastically displaces with respect to the arm 11. The arm 11 comprises a bracket 13 to which a stabilizer link is attached. The suspension device 10 supports the car body weight applied to the tire 30. A stabilizer device 20 comprises a substantially C-shaped bar 21 and is attached to the car body via bushes 22. The stabilizer device 20 ensures roll rigidity for the car body.

FIG. 2 is a side cross sectional view showing an embodiment of a portion of a structure of a stabilizer link 200. The stabilizer link 200 comprises a stud ball 201, ball seat 301, housing 302, and a dust cover 401. The stud ball 201 has a stud portion 210 and a ball portion 220 that are integrally formed.

The stud portion 210 has a taper portion 211, a straight portion 212, and a screw portion 213. The taper portion 211 is formed at the upper end portion of the ball portion 220. A flange portion 214 is formed at the upper end of the straight portion 212 and a projection 215 is formed at the lower end of the straight portion 212. The dust cover 401 has a lip portion 411 at the upper end thereof, which is abutted and attached to the intermediate portion between the flange portion 214 and the projection 215 of the straight portion 212. The screw portion 213 of the stabilizer link 200, which is the suspension device 10 side, is screwed and attached to the bracket 13 of the arm portion 11. The screw portion 213 of the stabilizer link 200, which is the stabilizer device 20 side, is screwed and attached to the bar 21.

The ball seat 301 and the housing 302 construct a bearing member that universally supports the stud ball 201. The ball portion 220 of the stud ball 201 is press inserted into the ball seat 301. A thermal calking portion 323 is formed at the bottom portion of the ball seat 301. The housing 302 contains the ball seat 301. The thermal calking portion 323 penetrates the hole portion 302A and projects therefrom. The end portion of the thermal calking portion 323 is engaged with the lower surface portion of the housing 302, whereby the ball seat 301 is fixed to the housing 302. The dust cover 401 has an attaching portion 412 at the lower end thereof, which is held between a flange portion 321 of the ball seat 301 and a flange portion 311 of the housing 302 (for example, Japanese Unexamined Patent Application Publication Nos. 6-117429 and 7-54835).

As a material for a housing and a supporting bar, types of steel have been used, and recently, aluminum (for example, in Japanese Unexamined Patent Applications Publications Nos. 2004-316771 and 2005-265134) and resins (for example, in Japanese Unexamined Patent Application Publication No. 2009-257507) have been proposed for weight reduction. Specifically, in Publications Nos. 2004-316771 and 2005-265134, a ball portion of a stud ball and a ball seat are assembled, and the subassembly is inserted into a mold as a core, and then an aluminum alloy is injected into the mold, whereby a housing and a support bar made of the aluminum alloy are integrally formed. In Japanese Unexamined Patent Application Publication No. 2009-257507, a resin is injected into a mold, whereby a housing and a support bar made of the resin are integrally formed.

DISCLOSURE OF THE INVENTION

In the case in which the housing and the support bar are integrally formed as shown in Japanese Unexamined Patent Applications Publications Nos. 2004-316771, 2005-265134, and 2009-257507, when the circumferential position and the distance between two housings are changed, a new mold corresponding to the circumferential position and the distance must be prepared.

An object of the present invention is to provide a method for manufacturing a stabilizer link in which weight reduction can be achieved and the circumferential position and the distance between two housings can be adjusted.

The present invention provides a method for manufacturing a stabilizer link, comprising: preparing a solid support bar or a hollow support bar made of a light metal or a fiber reinforced plastic; inserting an end portion of the support bar into a mold as a core; and molding a housing by injecting a resin into the mold; wherein the housing is fixed at the end portion of the support bar in the molding.

In the method for manufacturing a stabilizer link of the present invention, a solid support bar or a hollow support bar made of a light metal or a fiber reinforced plastic is used. An end portion of the support bar is inserted into the mold as a core and a housing is formed at an end portion of the support bar by injection molding, and the other end portion of the support bar is inserted into the mold as a core and a housing is formed at the other end portion of the support bar by injection molding.

In the forming of the housing, the injected resin in the injection molding is mold-shrunk, whereby the housings are rigidly fixed to both end portions of the support bar. In this case, the housings may be simultaneously formed at both end portions of the support bar by two molds. Alternatively, the housings may be formed at both end portions of the support bar in order by one mold.

In the forming of the housing, a solid support bar or a hollow support bar made of a light metal or a fiber reinforced plastic is used, and a resin is used for a material of the housing, whereby weight reduction is achieved. The present invention is different from the conventional technique in which a support bar and housings are integrally formed. In the present invention, the molds at both ends of the support bar are not integrated, whereby the circumferential position of the housing can be adjusted. Since the length of the support bar can be changed, the distance between the housings can be adjusted. Therefore, there is no need to change molds according to the circumferential position of the housing and the distance between the housings.

Various structures may be applied in the method for manufacturing a stabilizer link of the present invention. For example, when the support bar is formed, etching or blasting is performed to at least the end portion of the support bar. In this embodiment, the surface roughness of the end portion of the support bar can be roughed, whereby the end portion of the support bar can be rigidly fixed to the housing by an anchor effect. Therefore, the housing can be prevented from rotating and separating with respect to the support bar. In this case, the surface roughness Ra of the end of the support bar is preferably set within 0.03 to 5.0 μm.

When the support bar is formed, a concavoconvex portion is formed on the end portion of the support bar. In this embodiment, the concavoconvex portion of the end portion of the support bar may be closely fitted into portions facing thereto in the housing, whereby the end portion of the support bar can be rigidly fixed to the housing and the housing can be prevented from rotating and separating with respect to the support bar.

When a hollow support bar is used, the end of the support bar may be closed. Specifically, a plug may be provided to the end of the support bar. Alternately, the end portion of the support bar is worked to be flat and closed. In these embodiments, flow of resin into the hollow portion of the bar is avoided.

When a ball seat is formed, a pin portion is formed at a bottom portion of the ball seat. When the housing is formed, a hole portion is formed at a bottom portion of the housing. When the housing is assembled at the ball seat, the pin portion of the ball seat is projected from the hole portion of the housing and is thermal calked to the housing.

A ball portion of a stud ball is inserted into a ball seat, thereby forming a subassembly composed of the stud ball and the ball seat. When the housing is formed, the subassembly and the support bar are inserted into the mold as a core, and the molding is performed by injecting the resin into the mold, wherein the housing covers a circumferential surface of the ball seat in the forming of the housing. When the ball seat is formed, a recess portion is formed on a circumferential surface of the ball seat, and the end portion of the support bar is closely fitted into the recess portion of the ball seat when the support bar is inserted into the mold in forming of the housing. In this embodiment, the ball seat is prevented from rotating and separating with respect to the housing. In this case, the cross section in which the end portion of the support bar is closely fitted into the recess of the ball seat may have a shape other than being completely round. In this embodiment, relative rotation of the support bar with respect to the ball seat is effectively avoided, whereby relative rotation of the support bar with respect to the housing is effectively avoided.

The stabilizer link of the present invention is obtained by the above method of the present invention and can yield the same effects as in the method of the present invention.

Effects of the Invention

According to the present invention, according to the stabilizer link and the method for manufacturing same, the circumferential position and the distance between the housings can be changed without changing the mold.

BRIEF DESCRIPTION OF THE DRAWINGS

FIGS. 9A to 9E are side cross sectional views of a portion of a stabilizer link showing steps for manufacturing the stabilizer link of an embodiment of the present invention.

FIGS. 10A to 10D are side cross sectional views of a portion of a stabilizer link showing steps for manufacturing the stabilizer link of another embodiment of the present invention.

FIGS. 11A to 11D are side cross sectional views of a portion of a stabilizer link showing steps for manufacturing the stabilizer link in a modification of the embodiment shown in FIGS. 10A to 10D.

Figure 1:
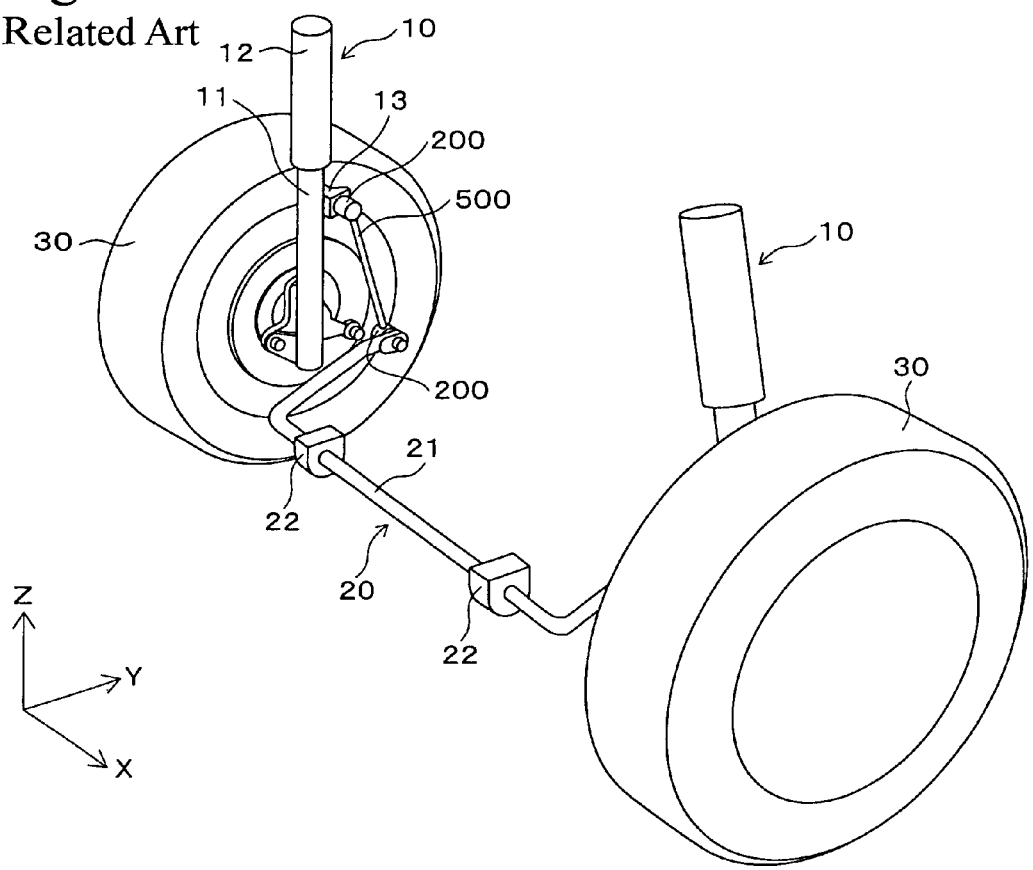
FIG. 1 is a perspective view showing a schematic structure of a front wheel side portion of a vehicle.

EXPLANATION OF REFERENCE NUMERALS 1 and 2 denote a stabilizer link, 3 denotes a subassembly, 50 denotes a housing, 50A denotes a hole portion, 52 denotes a boss portion, 60 denotes a support bar, 61 denotes an end portion, 62 denotes a hollow portion, 63 denotes a circumferential groove portion (recess portion of a concavo-convex portion), 64 denotes an axial groove portion (recess portion of a concavo-convex portion), 65 denotes a sloping groove portion (recess portion of a concavo-convex portion), 66 denotes a circular recess portion (recess portion of a concavo-convex portion), 67 denotes a crossing groove portion (recess portion of a concavo-convex portion), 68A denotes a tapered groove portion (recess of a concavo-convex portion), 68B denotes a curved groove portion (recess of a concavo-convex portion), 69 denotes a plug portion, 101 and 201 denote stud balls, 110 and 220 denote ball portions, 101 and 201 denote ball portions, 120 and 301 denote ball seats, 122 denotes a projection, 123 denotes a groove portion, 124 denotes a recess portion for a support bar (recess portion), 322 denotes a pin portion, 323 denotes a thermal calking portion, and 602 denotes a mold.

BEST MODE FOR CARRYING OUT THE INVENTION

Figure 3A:
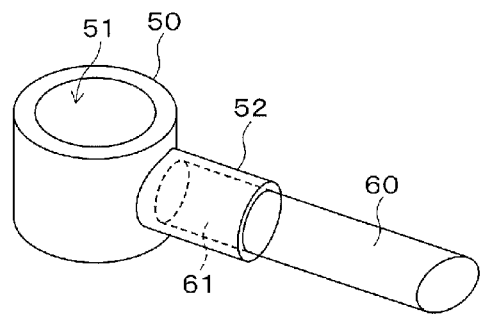
FIG. 3A is a perspective view showing a portion of a stabilizer link of an embodiment of the present invention, specifically, a left portion of a housing and a support bar in which a solid bar is used for the support bar.
Figure 3B:
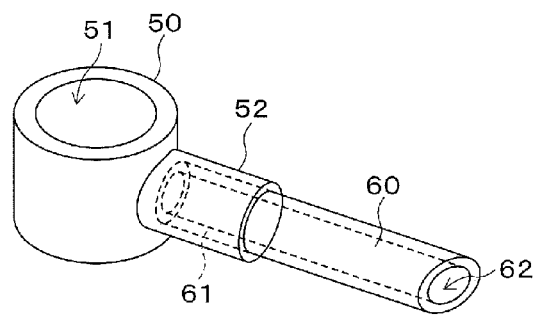
FIG. 3B is a perspective view showing a left portion of a housing and a support bar in which a hollow bar is used for the support bar.

An embodiment of the present invention will be explained hereinafter with reference to the drawings. FIGS. 3A and 3B show a structure of a stabilizer link according to the embodiment of the present invention, and specifically, they are perspective views showing schematic structures of housings and support bars. In FIGS. 3A and 3B, the shape of the housings are simplified.

The housing 50 has an opening 51 into which a ball seat is press fitted. A boss portion 52 is formed on a circumferential surface of the housing 50. The housing 50 is made of a resin. Engineering plastics such as PA (nylon), POM (polyacetal), PBT (polybutylene terephthalate), and PPS (polyphenylene sulfide) are used for the resin. Glass fiber is preferably contained in the engineering plastics for ensuring strength.

The housing 50 is fixed at both ends 61 of the support bar 60. In this case, a solid bar is used as shown in FIG. 3A or a hollow bar having a hollow portion 62 is used for weight reduction as shown in FIG. 3B. The support bar 60 is made of a light metal or a fiber reinforced plastic (FRP). Nonferrous metals such as aluminum, magnesium, and titanium are used for the light metal. When a hollow bar is used, weight reduction can be achieved regardless of kind of material. Therefore, the material for a hollow bar is not limited to the above materials, and various types of steel, and the like, can be used.

In the embodiment, the support bar 60 is prepared. In this case, the length of the support bar 60 may be suitably decided. Then, the end portion of the support bar is inserted into a mold as a core, and a resin is injected into the mold for injection molding, whereby the housing 50 is formed. In this case, the resin is mold-shrunk, whereby the boss portion 52 of the housing 50 covers and adheres to the whole circumference of the end portion 61 of the support bar 60 thereof. Therefore, the boss portion 52 is rigidly fixed to the end portion 61.

Characteristics of the resin may be different according to the quality of the material. The mold shrinkage ratio may be about 1.5 to 2.0%, and the coefficient of linear expansion may be about 3 to $9 \times 10^{-5\circ}$ C. Generally, the maximum temperature in use of a stabilizer link is about 80° C. If the coefficient of linear expansion is in the room temperature of 23° C., the expansion coefficient of the resin in 80° C. is 0.17 to 0.69%. Therefore, even though the environmental temperature reaches 80° C., the expansion coefficient is sufficiently small compared to the mold shrinkage ratio of 1.5 to 2.0%. Therefore, tightening force generated by the boss portion 52 is not decreased by the thermal expansion of the resin.

Prevention of separation of the housing 50 from the support bar 60 and prevention of rotation the support bar 60 with respect to the housing 50 are ensured by frictional forces due to coefficients of friction of the housing 50 and the support bar 60 and tightening force caused by mold shrinkage of the resin. The support bar 60 may have various structures for effectively ensuring the prevention of separation and the prevention of rotation.

For example, the frictional force can be increased by setting the axial length to be large for the portion of the housing covering the end portion 61 of the support bar 60. The tightening force caused by mold shrinkage by setting the thickness of the boss portion 52 of the housing 50 to be large. In this case, in order to avoid generation of defects such as voids in the injection molding, the thickness of the boss portion 52 is set preferably to be 4 mm or less.

Figure 4A:
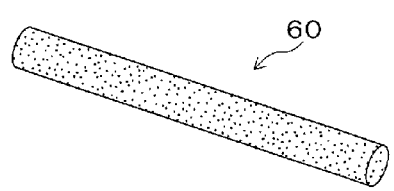
FIGS. 4A and 4B are perspective views showing support bars of a stabilizer link of an embodiment of the invention.
Figure 4B:
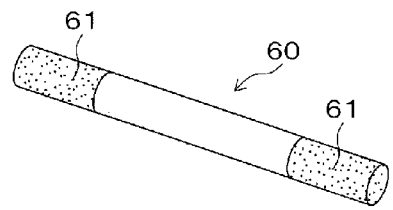

As shown in FIGS. 4A and 4B, etching or blasting is performed on both end portions 61 or on the entirety of the portion of the support bar 60. By such treatments, for example, an oxide film is formed on the surface, thereby forming a concavo-convexity. Therefore, the surface of end portions 61 or of the entirety of the support bar 60 is roughened, whereby mechanical force is generated and frictional force is increased by anchoring effects. The surface roughness Ra is preferably set within 0.03 to 5.0 μm.

Figure 5A:
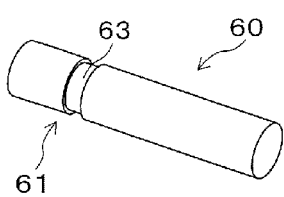
FIGS. 5A to 5F are perspective views showing left side portions of other support bars of a stabilizer link of an embodiment of the invention.

A concavo-convex portion such as a knurl may be formed on the end portion 61 of the support bar 60 by rolling. For example, in an embodiment shown in FIG. 5A, a circumferential groove portion 63 extending in the circumferential direction is formed on the end portion 61 as a recess portion. In this embodiment, separation of the housing 50 can be effectively avoided. For example, in the embodiment shown in FIG. 5B, axial groove portions 64 extending in the axial direction are formed on the end portion 61 as a recess portion. In this embodiment, rotation of the housing 50 can be effectively avoided.

Figure 5B:
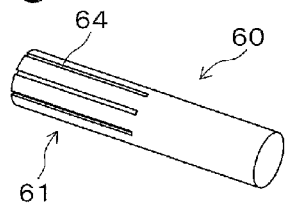
Figure 5C:
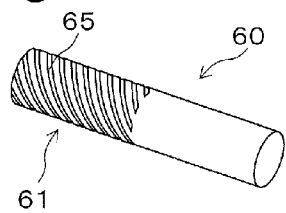
Figure 5D:
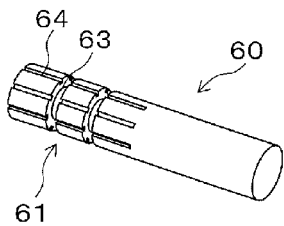
Figure 5E:
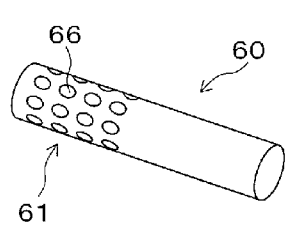
Figure 5F:
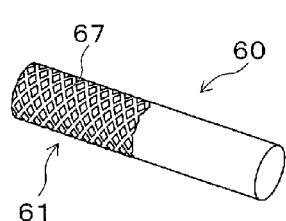

In an embodiment shown in FIG. 5C, sloping groove portions 65 extending in the direction that are inclined at a predetermined angle with respect to the axis are formed on the end portion 61 as a recess portion. In an embodiment shown in FIG. 5D, the circumferential grooves 63 shown in FIG. 5A and the axial grooves 64 shown in FIG. 5B are combined together. In an embodiment shown in FIG. 5E, circular recess portions 66 are formed on the end portion 61 as a recess portion. In this case, the shape of the recess portions 66 is not limited to a circle, and various shapes may be used. In an embodiment shown in FIG. 5F, crossing groove portions 67 in which sloping groove portions extending inclining with respect to the axis are crossing each other are formed as a recess portion. In the embodiments shown in FIGS. 5A to 5F, separation and rotation of the housing 50 can be effectively avoided.

Figure 6A:
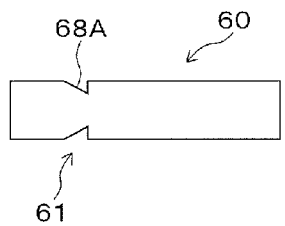
FIGS. 6A and 6B are side cross sectional views showing left side portions of other support bars of a stabilizer link of an embodiment of the invention.
Figure 6B:
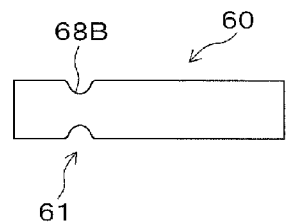

In the above embodiments, the number of recess portions is suitably set. In the embodiments, recess portions such as grooves are formed, but projections may be formed instead of the recesses. The side surface in the groove portion is preferably tapered. For example, the side surface in the tapered groove portion 68A shown in FIG. 6A is inclined such that the diameter is gradually decreased from the end portion 61 to the longitudinal center portion of the support bar 60 in the side cross section. For example, the side surface in the curved groove portion 68B shown in FIG. 6B is tapered in a curved shape in the side cross section. In the above embodiments, a resin can be filled in a bottom corner portion of the groove portion in injection molding. The shape of the cross section of the end portion 61 of the support bar 60 may be a shape other than completely round, and for example may be a polygonal shape, a star-shape, and an oval shape. The above embodiments may be applied to both end portions 61 of the support bar or be applied to only one end portion 61 according to necessity. The above embodiments may be suitably combined.

Figure 7:
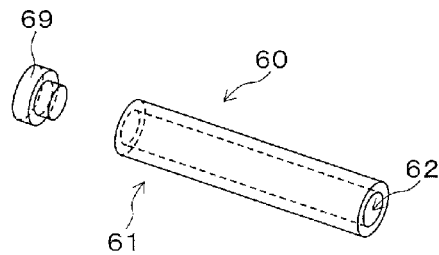
FIG. 7 is a perspective view showing a left side portion of another support bar of a stabilizer link of an embodiment of the invention.
Figure 8A:
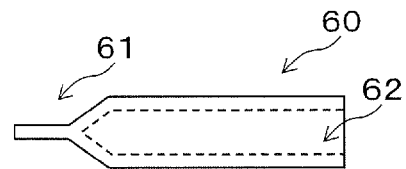
FIG. 8A is a side cross sectional view showing a left portion of another support bar of an embodiment of the present invention and FIG. 8B is a top view showing the left portion of the support bar.
Figure 8B:
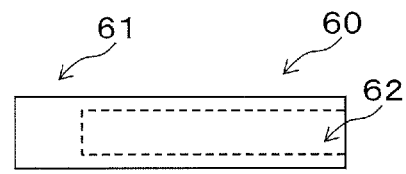

When the hollow bar shown in FIG. 3B is used as the support bar 60, various structures may be applied to avoid resin flowing into the hollow portion 62 of the support bar 60. In the embodiment shown in FIG. 7, a plug portion 69 is provided to the end portion 61 of the support bar 60. The material of the plug portion 69 may be selected from the materials used for the housing 500. In this case, the same resin as the housing 50 is preferably selected. In this embodiment, the boundary of the plug portion 69 and housing is melted, and the housing 50 and the plug portion 69 are sufficiently adhered. As shown in FIGS. 8A and 8B, the end portion 61 of the support bar 60 is worked to be flat, and the opened portion of the support bar 60 is closed.

In the embodiment, a solid bar is made of a light metal or FRP, and alternatively, a hollow bar may be used for the support bar 60. The end portion 61 of the support bar 60 is inserted into a mold as a core, the housing 50 is formed at the end portion 61 of the support bar 60, another end portion 61 of the support bar 60 is inserted into the mold as a core, and the housing 50 is formed at another end portion 61 of the support bar 60. In the formation of the housing 50, the injected resin is mold-shrunk, whereby the housings 50 are rigidly fixed to both ends of the support bar 60.

In the formation of the housing 50, two molds may be used and the housings 50 are simultaneously formed at one end portion 61 and another end portion 61 of the support bar 60. In this case, because the molds at both ends of the support bar 60 are not integrated, each mold can be positioned in the circumferential position around the axis, and thereby the relative circumferential angle of the molds can be adjusted. Furthermore, change of the length of the support bar 60 can be managed.

When shapes of the housings 50 at both ends of the support bar 60 are the same, housings 50 are formed at the end portion 61 and another end portion 61 of the support bar 60, in order. Specifically, after forming the housing 50 at the end portion 61 of the support bar 60, when the housing 50 is formed at another end portion 61 of the support bar 60, the position of the mold for another end portion 61 side with respect to the direction around the axis can be set, whereby the position in the circumferential direction of the molds can be adjusted. Furthermore, change in the length of the support bar 60 can be managed.

As mentioned above, in the formation of the housing 50, a solid bar made of a light metal of FRP or a hollow bar is used as the support bar 60 and a resin is used as a material of the housing 50, whereby weight reduction can be achieved. Furthermore, the circumferential angle of the housings 50 can be adjusted and the distance between the housings 50 can be adjusted. Therefore, there is no need to change the mold according to the circumferential angle and the distance between the housings 50.

The method for forming the housing 50 can be applied to manufacturing methods for various stabilizer links.

Figure 2:
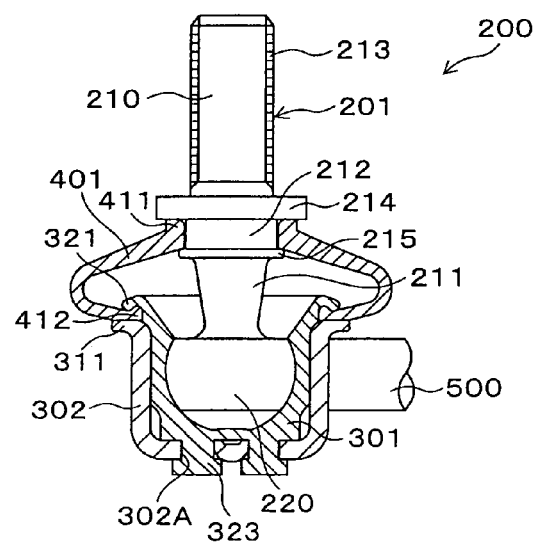
FIG. 2 is a side cross sectional view showing a structure of a conventional stabilizer link.

FIGS. 9A to 9E are side cross sectional views of a portion of a stabilizer link showing steps for manufacturing the stabilizer link of an embodiment of the present invention. The stabilizer link 1 has the same structures as the stabilizer link 200 shown in FIG. 2, except for the housing and the support bar. In this embodiment, the same reference numerals as in FIG. 2 are applied to the same structures as in FIG. 2 and explanation of these same structures is omitted. In FIGS. 9A to 9E, a screw portion 213 is not shown.

As shown in FIG. 9A, the lip portion 411 of the dust cover 401 is inserted between the flange portion 214 and the projection 215 while closely contacting the lip portion 411 to the straight portion 212 of the stud ball 201, whereby the lip portion 411 is held therebetween. Then, as shown in FIG. 9B, the ball portion 220 of the stud ball 201 is press fitted into the ball seat 301. In this case, the attaching portion 412 of the dust cover 401 is disposed at the circumferential surface side (upper surface side in FIG. 9A) of the flange portion 321 of the ball seat 301. Reference numeral 322 denotes a pin portion on a surface (reverse surface of the surface into which the ball portion 220 is press fitted) of the ball seat 301.

Then, as shown FIG. 9C, the housing 50 having the support bar 60 is assembled to the ball seat 301. In this case, the attaching portion 412 of the dust cover 401 is held between the flange portion 321 of the ball seat 301 and the flange portion 53 of the housing 50, and the pin portion 322 projects outside from the hole portion 50A. The housing 50 was obtained by the abovementioned process in which the end portion 61 of the support bar 60 was inserted into the mold as a core, and a resin is injected into the mold for injection molding. Next, as shown in FIG. 9D, a thermal calking apparatus 601 is used, wherein the pin portion 322 of the ball seat 301 is deformed by heating, thereby obtaining a thermal calking portion 323. Therefore, the ball seat 301 is fixed to the housing 50, thereby obtaining the stabilizer link 1 as shown in FIG. 9E.

In the above manufacturing method, when POM is used as a material of the ball seat 301 in which the pin portion 322 is thermally calked, since the melting point is about 165° C., PA, PPS, or PBT having a higher melting point than that of the POM is preferably used as a material of the housing 50.

FIGS. 10A to 10D are side cross sectional views of a portion of a stabilizer link showing steps for manufacturing the stabilizer link of another embodiment of the present invention. In FIGS. 10A to 10D, the screw portion 213 is not shown. The manufacturing method is different from that shown in FIGS. 9A to 9E in that the housing 50 is obtained by injection molding for resin using insert molding. According to the difference, the structure of the ball seat and the shape of the ball portion of the stud ball are changed, and other portions are the same as that shown in FIGS. 9A to 9E.

As shown in FIGS. 10A and 10B, a subassembly 2A composed of the stud ball 101, the ball seat 120, and the dust cover 401 is obtained by a similar process to the process as shown in FIGS. 9A and 9B. In this process, at least one of the projection 122 and the groove portion 123 is preferably formed on the circumferential surface of the ball seat 120 along the circumferential direction. In the stud ball 101, for example, a substantially spherical steel ball is preferably used as a ball portion 110, and ball portion 110 is preferably welded to the stud portion.

Next, as shown in FIG. 10C, the subassembly 2A and the end portion 61 of the support bar 60 are inserted into a mold 602 as a core, and a cavity 700 is formed, and a resin is injected into the cavity 700, thereby performing injection molding. The housing 50 is formed by such an insert molding. In the insert molding, specifically, when the subassembly 2A is inserted into the mold 602, a gap is formed between the inner surface of the mold 602 and the outer surface of the ball seat 120, the end portion 602A of the mold 602 is abutted to the circumferential portion of the fixing portion 412 of the dust cover 401. By this operation, the fixing portion 412 of the dust cover 401 is held between the end portion 602A of the mold 602 and the proximity of the circumferential portion of the flange portion 121 of the ball seat 120. Thus, the cavity 700 is formed by the inner surface of the mold 602, the outer surface of the ball seat 120, and the circumferential portion of the fixing portion 412 of the dust cover 401.

When a resin is injected into the cavity 700 in the insert molding, as shown in FIG. 10D, the housing 50 is formed, and the stabilizer link 2 is obtained. In this case, the housing 50 is fixed to the end portion 61 of the support bar 60, and has a shape that covers the circumferential portion of the ball seat 120.

In the above process, thermal calking is not performed. Therefore, when POM is used as a material of the ball seat 120, the melting point of the resin composing the housing 50 can be higher than that of POM, and glass fiber can be contained in the engineering plastics such as PA, PBT, PPS, and POM. The groove portion 54 of the housing 50, the projection 122 of the ball seat 120, the projection 55 of the housing 50, and the groove portion 123 of the ball seat 120 are preferably formed to have shapes that are circumferentially divided. By such a structure, separation of the housing from the ball seat 120 can be avoided and relative rotation of the ball seat 12 with respect to the housing 50 can be avoided.

FIGS. 11A to 11D are side cross sectional views of a portion of a stabilizer link showing steps of a modification of the embodiment shown in FIGS. 10A to 10D. The steps shown in FIGS. 11A and 11B are the same as the steps shown in FIGS. 10A and 10B. In the step shown in FIG. 11C, a recess portion 124 for the support bar 60 is formed on the circumferential portion of the ball seat 120. When the housing 50 is formed, the end portion 61 of the support bar 60 is closely fitted into the recess portion 124 for the support bar 60 in inserting the support bar 60 into the mold 602. In the modification, the same effects as the thermal calking portion 323 shown in FIGS. 9D and 9E can be obtained. In this case, the shape of the cross section of the closely fitting portion of the end portion 61 of the support bar 60 and the recess portion 124 of the ball seat 120 may be any shape other than completely round, and for example, it may be a polygonal shape, a star-shape, and an oval shape. By such a structure, relative rotation of the support bar 60 with respect to the ball seat 120 can be effectively avoided, whereby relative rotation of the support bar 60 with respect to the housing 50 can be effectively avoided. As shown in FIGS. 8A and 8B, a support bar 60 having the flat end portion 61 is used, and the same effects as above can be obtained.

INDUSTRIAL APPLICABILITY

The above manufacturing method is an improvement of the method proposed by the applicant (for example, Japanese Patent Applications Nos. 2010-120380 and 2010-186080) and various modifications can be made within the scope of the present invention.

The invention claimed is:

1. A method for manufacturing a stabilizer link, the method comprising:
   preparing a solid support bar or a hollow support bar made of a light metal or a fiber reinforced plastic;
   inserting an end portion of the support bar into a mold as a core; and
   molding a housing by injecting a resin into the mold;
   wherein the housing is fixed at both end portions of the support bar in the molding,
   a ball portion of a stud ball is inserted into a ball seat, thereby forming a subassembly composed of the stud ball and the ball seat,
   the housing is formed while the subassembly and the support bar are inserted into the mold as a core,
   the molding is performed by injecting the resin into the mold, whereby the housing covers a circumferential surface of the ball seat.

2. The method for manufacturing a stabilizer link according to claim 1, wherein the support bar is formed while etching or blasting is performed to at least the end portion of the support bar.

3. The method for manufacturing a stabilizer link according to claim 1, wherein the end portion of the support bar has a surface roughness Ra of 0.03 to 5.0 μm.

4. The method for manufacturing a stabilizer link according to claim 1, wherein the support bar is formed while a concavoconvex portion is formed on the end portion of the support bar.

5. The method for manufacturing a stabilizer link according to claim 1, wherein the support bar is hollow, and a plug is provided to the end of the support bar.

6. The method for manufacturing a stabilizer link according to claim 1, wherein the support bar is hollow, and the end portion of the support bar is worked to be flat and closed.

7. The method for manufacturing a stabilizer link according to claim 1, wherein:
   a ball seat is formed while a pin portion is formed at a bottom portion of the ball seat,
   the housing is formed while a hole portion is formed at a bottom portion of the housing,
   the housing is assembled to the ball seat while the pin portion of the ball seat is projected from the hole portion of the housing, and
   the pin portion is thermal calked to the housing.

8. The method for manufacturing a stabilizer link according to claim 1, wherein the ball seat is formed while a recess portion is formed on a circumferential surface of the ball seat,
   the end portion of the support bar is closely fitted into the recess portion of the ball seat when the support bar is inserted into the mold in forming of the housing.

9. The method for manufacturing a stabilizer link according to claim 8, wherein the cross section in which the end portion of the support bar is closely fitted into the recess of the ball seat and has a shape other than completely round.

10. A stabilizer link manufactured by the method according to claim 1.

* * * * *